United States Patent
Jiang et al.

(10) Patent No.: US 12,187,818 B2
(45) Date of Patent: Jan. 7, 2025

(54) CHITIN-BASED SUPERABSORBENT MATERIALS

(71) Applicant: ARIZONA BOARD OF REGENTS ON BEHALF OF ARIZONA STATE UNIVERSITY, Scottsdale, AZ (US)

(72) Inventors: Hanging Jiang, Chandler, AZ (US); Junchao Huang, Tempe, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 0 days.

(21) Appl. No.: 18/573,887

(22) PCT Filed: Jul. 1, 2022

(86) PCT No.: PCT/US2022/073382
§ 371 (c)(1),
(2) Date: Dec. 22, 2023

(87) PCT Pub. No.: WO2023/279102
PCT Pub. Date: Jan. 5, 2023

(65) Prior Publication Data
US 2024/0262936 A1    Aug. 8, 2024

Related U.S. Application Data

(60) Provisional application No. 63/217,664, filed on Jul. 1, 2021.

(51) Int. Cl.
| | | |
|---|---|---|
| C08B 37/08 | (2006.01) | |
| A23L 33/24 | (2016.01) | |
| C08J 3/24 | (2006.01) | |
| C08J 9/00 | (2006.01) | |
| C08K 5/31 | (2006.01) | |
| C08L 5/08 | (2006.01) | |

(52) U.S. Cl.
CPC ............ *C08B 37/003* (2013.01); *A23L 33/24* (2016.08); *C08J 3/24* (2013.01); *C08J 9/0028* (2013.01); *C08K 5/31* (2013.01); *C08L 5/08* (2013.01); *C08J 2205/022* (2013.01); *C08J 2305/08* (2013.01)

(58) Field of Classification Search
None
See application file for complete search history.

(56) References Cited

U.S. PATENT DOCUMENTS

| | | | |
|---|---|---|---|
| 6,087,448 A | 7/2000 | Mitchell et al. | |
| 2008/0305950 A1* | 12/2008 | Berrada | C08B 33/00 536/55.1 |

FOREIGN PATENT DOCUMENTS

| | | |
|---|---|---|
| CN | 101857684 A | 10/2010 |
| CN | 103059320 B | 2/2015 |

OTHER PUBLICATIONS

CN101857684A, machine translation, 2010. (Year: 2010).*
Kurita, Journal of Polymer Science: Part A: Polymer Chemistry, vol. 31, 485-491 (1993). (Year: 1993).*
Nita, Pharmaceutics 2020, 12, 449, pp. 1-31. (Year: 2020).*
International Search Report and Written Opinion for Application No. PCT/US2022/073382 dated Oct. 3, 2022 (6 pages).
Cheng, B., et al. "Advances in chitosan-based superabsorbent hydrogels." Rsc Advances 7.67 (2017): 42036-42046.
Huang, J., et al. "Continuous Pilot-Scale Wet-Spinning of Biocompatible Chitin/Chitosan Multifilaments from an Aqueous KOH/Urea Solution." Macromolecular Rapid Communications 42.16 (2021): 2100252.
Huang, J., et al. "Rapid dissolution of β-chitin and hierarchical self-assembly of chitin chains in aqueous KOH/urea solution." Green Chemistry 23.8 (2021): 3048-3060.
Jiménez-Gómez, C. P., et al. "Chitosan: a natural biopolymer with a wide and varied range of applications." Molecules 25.17 (2020): 3981.
Chang, C., et al. "Superabsorbent hydrogels based on cellulose for smart swelling and controllable delivery." European polymer journal 46.1 (2010): 92-100.
Demitri, C., et al. "Novel superabsorbent cellulose-based hydrogels crosslinked with citric acid." Journal of Applied Polymer Science 110.4 (2008): 2453-2460.
Rodrigues, FHA, et al. "Superabsorbent hydrogel composites with a focus on hydrogels containing nanofibers or nanowhiskers of cellulose and chitin." Journal of Applied Polymer Science 131.2 (2014) (13 pages).

* cited by examiner

*Primary Examiner* — Layla D Berry
(74) *Attorney, Agent, or Firm* — Michael Best & Friedrich LLP

(57) ABSTRACT

Provided are a chitin-based superabsorbent materials and method of preparation thereof. The superabsorbent material comprises chitin crosslinked by an epoxy crosslinker, and guanidine attached to the crosslinked chitin. The preparation method includes dissolving chitin in an aqueous solvent to form a solution; reacting the dissolved chitin with an epoxy crosslinker and guanidine, or a salt thereof, thereby forming a hydrogel; and drying the hydrogel.

14 Claims, No Drawings

CHITIN-BASED SUPERABSORBENT MATERIALS

CROSS-REFERENCE TO RELATED APPLICATIONS

The present application claims priority to U.S. provisional patent application No. 63/217,664, filed Jul. 1, 2021, the disclosure of which is hereby incorporated by reference in its entirety.

INTRODUCTION

Chitin is a naturally occurring polymer. For example, β-chitin extracted from squid pen has been proved to be biocompatible, biosafe and biodegradable, showing a great potential in the medicine, cosmetic, food, agricultural and biomaterial fields. As one of the most abundant natural polymers with the above advantages, chitin and its derivates are the optimal primary materials in many applications. However, chitin is a polymer with nearly electrical neutrality, when serving as a superabsorbent its swelling capacity always lower than the synthetic polymers, such as sodium polyacrylate. Also, the high chain stiffness of chitin molecules prevents further swelling in water, which is quite difficult to compare with polyacrylamide.

The swelling capacity of chitin materials may be increased by chemical derivatization on chitin molecules, such as carboxylation, carboxylmethylation, sulfonation, xanthation, phosphorization, hydroxylation, hydroxylethylation, nitration, and chemical modification by other synthetic polymers used for superabsorbent. These methods may increase the osmotic pressure of chitin molecules by ionized functional groups and decrease the chain stiffness by reducing the hydrogen bonding interactions between chitin molecules. In addition, the utilization of crosslinkers may further increase the swelling capacity. However, these chemical derivatization methods provide high density of negative charge on chitin molecules, which only allows high swelling in water or alkalescence solutions and leads to shrinkage in acid solutions.

Chitosan is the deacetylated product of chitin. The detaching of the acetyl groups on C-2 of chitin generates a proton favorable amide functional groups, making chitosan soluble in acid solution. A common method to prepare chitosan-based superabsorbent is to graft the acrylamide and acrylate-based monomer on the hydroxyl groups on C-6 of chitosan, and further polymerization to fabricate chitosan-polyacrylamide and chitosan-polyacrylate hybrid polymer.

Yet this method provides excess negative charge on chitosan molecules which makes it shrink in the acid solutions. Using aldehyde crosslinker to crosslink chitosan molecules only produces hydrogels with low swelling capacity. Using epoxy crosslinker to make chitosan hydrogel is also a challenge due to the low reactivity of epoxy in acid solvent and the low solubility of chitosan in alkali solution.

Thus, there remains a need for chitin-based polymers that may effectively function as superabsorbent materials in acid solutions.

SUMMARY

Chitin-based aerogel used for superabsorbent materials in acid solutions is rarely seen. The employment of chitin ensures biosafety to human body. As disclosed herein, introduction of guanidine and epoxy crosslinker to chitin polymer structure enables a high swelling capacity of the resulting chitin-based aerogel superabsorbent in acid and neutral solutions. The chitin-based superabsorbent polymers disclosed herein may be useful in preparing edible compositions for hyperchlorhydria treatment and obesity control.

In one aspect, the present disclosure provides a method of preparing a superabsorbent material, comprising dissolving chitin in an aqueous solvent to form a solution; reacting the dissolved chitin with an epoxy crosslinker and guanidine, or a salt thereof, thereby forming a hydrogel; and drying the hydrogel.

In another aspect, the present disclosure provides a superabsorbent material comprising chitin crosslinked by an epoxy crosslinker, and guanidine attached to the crosslinked chitin.

DETAILED DESCRIPTION

The present disclosure relates to utilization of natural chitin polymer in a preparation method for a superabsorbent polymer useful for acid solution. The polymer as disclosed herein may have a structure that combines chitin polymer, crosslinker, and components for increasing absorbency in an acid solution.

Before any embodiments of the invention are explained in detail, it is to be understood that the invention is not limited in its application to the details of construction and the arrangement of components set forth in the following description. The invention is capable of other embodiments and of being practiced or of being carried out in various ways.

1. Definitions

Unless otherwise defined, all technical and scientific terms used herein have the same meaning as commonly understood by one of ordinary skill in the art. In case of conflict, the present document, including definitions, will control. Suitable methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The terms "comprise(s)," "comprising," "include(s)," "including," "having," "has," "contain(s)," "containing," and variants thereof, as used herein, are open-ended transitional phrases, terms, or words that are meant to encompass the items listed thereafter and equivalents thereof as well as additional items. The singular forms "a", "and", and "the" include plural references unless the context clearly dictates otherwise. Where the term "comprising" is used, the present disclosure also contemplates other embodiments "comprising," "consisting of," and "consisting essentially of," the embodiments or elements presented herein, whether explicitly set forth or not. Any numerical range recited herein includes all values from the lower value to the upper value. For example, if a concentration range is stated as 1% to 50%, it is intended that values such as 2% to 40%, 10% to 30%, or 1% to 3%, etc., are expressly enumerated in this specification. These are only examples of what is specifically intended, and all possible combinations of numerical values between and including the lowest value and the highest value enumerated are to be considered to be expressly stated in this application.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

Definitions of specific functional groups and chemical terms are described in more detail below. For purposes of this disclosure, the chemical elements are identified in accordance with the Periodic Table of the Elements, CAS version, Handbook of Chemistry and Physics, 75th Ed., inside cover, and specific functional groups are generally defined as described therein. Additionally, general principles of organic chemistry, as well as specific functional moieties and reactivity, are described in Organic Chemistry, Thomas Sorrell, University Science Books, Sausalito, 1999; Smith and March March's Advanced Organic Chemistry, 5th Edition, John Wiley & Sons, Inc., New York, 2001; Larock, Comprehensive Organic Transformations, VCH Publishers, Inc., New York, 1989; Carruthers, Some Modern Methods of Organic Synthesis, 3rd Edition, Cambridge University Press, Cambridge, 1987; the entire contents of each of which are incorporated herein by reference.

The term "squid pen extracts" as used herein means an extract from squid pen that includes β-chitin as a major component. The extract may contain minimal amount of residual protein and minerals to ensure biosafety in biological applications (such as administration to a human). In certain embodiments, proteins and minerals are completely removed from the extract.

The term "effective amount," as used herein, refers to a dosage of an active agent compounds or a composition effective for eliciting a desired effect. This term as used herein may also refer to an amount effective at bringing about a desired in vivo effect in an animal, preferably, a human, such as treatment of a disease, such as a skin disease or condition.

The term "essentially free of" means that a composition contains a component in an amount of less than 1% by weight of the composition. This includes less than 0.5% by weight, less than 0.1% by weight, less than 0.05% by weight, or even less than 0.01% by weight. Compositions "essentially free of" a component also include a composition that is completely free of that component.

The term "treatment" as used herein in the context of treating a condition (such as a skin disease or condition), pertains generally to treatment and therapy, whether of a human or an animal (e.g. in veterinary applications), in which a desired therapeutic effect is achieved. For example, treatment includes prophylaxis and can ameliorate or remedy the condition, disease, or symptom, or treatment can inhibit the progress of the condition or disease (e.g., reduce the rate of disease/symptom progression or halt the rate of disease/symptom progression).

II. Exemplary Methods

Chinese Patent Application CN101857684A discloses a method to prepared chitin hydrogel by epoxy crosslinkers, where the crosslinkers includes the epichlorohydrin and the analogous reagents. U.S. Pat. No. 6,087,448 discloses poly (vinylguanidine)-based superabsorbent gels for acid solution absorption, which is prepared by reacting a polyvinylamine with a cyanamide. However, chemical modification to incorporate guanidine groups in chitin polymer structure has not been reported.

The present disclosure demonstrates that guanidine may be attached to a chitin polymer by epoxy crosslinking. In specific embodiments, the present disclosure provides a preparation process for a novel chitin-based hydrogel superabsorbent with acid absorption capacity, which includes chitin dissolution in alkali solution, followed by reaction with an epoxy crosslinker and a guanidine salt.

In one aspect, provided is a method of preparing a superabsorbent material, comprising dissolving chitin in an aqueous solvent to form a solution; reacting the dissolved chitin with an epoxy crosslinker and guanidine, or a salt thereof, thereby forming a hydrogel; and drying the hydrogel.

The chitin may be a synthetic material, a natural material, a derivative of a natural material. In some embodiments, the chitin is extracted from a natural source, such as an animal, a fungi, a plant, or a combination thereof. For example, suitable chitin includes a-chitin extracted from crab, shrimp, or fungi and β-chitin extracted from squid and cuttlefish. In some embodiments, the chitin used in the present method is β-chitin. In some embodiments, the present method uses β-chitin extracted from squid pen.

The aqueous solvent may be water or a mixture of water and at least one other suitable solvent.

In some embodiments, the solution comprises a hydroxide base, urea, or a combination thereof. The hydroxide base may be, for example, lithium hydroxide, sodium hydroxide or potassium hydroxide. In some embodiments, the chitin is at least partially deacetylated in the solution comprising the hydroxide base, urea, or a combination thereof to produce chitosan. The dissolved chitin in such solution may include both intact chitin and chitosan.

In some embodiments, the epoxy crosslinker is selected from the group consisting of epoxypropane, epichlorohydrin, diglycidyl ether, ethylene glycol diglycidyl ether, bisphenol A diglycidyl ether, 1, 6-hexanediol diglycidyl ether, glycerol diglycidyl ether, tris(4-hydroxyphenyl)methane triglycidyl ether, trimethylolpropane triglycidyl ether, poly (ethylene glycol) diglycidyl ether, and a combination thereof.

In some embodiments, the present method employs a molar ratio of the epoxy crosslinker to β-chitin is about 0.5:1 to about 20:1. This includes a molar ratio of the epoxy crosslinker to β-chitin of about 0.5:1, about 1:1, about 2:1, about 5:1, about 10:1, about 15:1, or about 20:1.

The guanidine used in the present method may be in the form of a salt. The guanidine salt may include, for example, guanidine hydrochloride, guanidine carbonate, guanidine thiocyanate, guanidine nitrate, biguanide and its derivates, triguanide and its derivates, or a combination thereof. In some embodiments, guanidine hydrochloride is used.

In some embodiments, the present method employs a molar ratio of the guanidine salt to the epoxy crosslinker of about 0.2:1 to about 2:1. This includes a molar ratio of the guanidine salt to the epoxy crosslinker of about 0.2:1, about 0.5:1, about 1:1, about 1.2:1, about 1.5:1, or about 2:1.

The drying process may remove essentially all remaining solvent in the hydrogel. In some embodiments, the drying process completely removes the remaining solvent in the hydrogel. In some embodiments, the drying process comprises exchanging the aqueous solvent remaining in the hydrogel to an organic solvent, such as ethanol, propanol, or isopropanol. Such exchange may produce an organogel. In some embodiments, the drying process of the present method comprises freeze drying. In some embodiments, the drying process comprises exchanging the aqueous solvent remaining in the hydrogel to an organic solvent thereby producing an organogel, and subsequently freeze drying the organogel.

In a particular embodiment, provided is a process for preparing a superabsorbent material based on squid pen extracts, which includes: extracting β-chitin from the squid pen and purifies it by sequent deproteinization, demineralization, washing and drying; dissolving β-chitin in an aqueous alkali/urea solution to form a chitin solution; introducing epoxy crosslinker and guanidine salts into the chitin solution and allow it to form as-prepared gel, then washing by deionized water to obtain a hydrogel; and solvent exchanging from water to isopropyl alcohol to obtain an organogel and then freeze drying to produce an aerogel.

The extracting of β-chitin from squid pen may include a continuous process of deproteinization, demineralization, washing and drying. The deproteinization may include an alkali treatment on squid pen. For example, an alkali solution may be used, which includes sodium hydroxide, potassium hydroxide or their mixtures. The amount of the alkali in solution may be about 3% to about 7% by weight, and the solution to material ratio may be about 5:1 to about 20:1. The temperature for the alkali treatment may be about 20° C. to about 80° C., and the time for the alkali treatment may be about 3 hours to about 24 hours. The demineralization may be an acidic treatment on squid pen. An acidic solution may be used, which comprises hydrochloride acid, sulfuric acid, or a mixture thereof. The amount of the acid in solution may be about 3% to about 7% by weight, and the liquid to material ratio may be about 5:1 to about 20:1. The temperature for the acid treatment may be about 20° C. to about 60° C., and the time for the acid treatment may be about 3 hours to about 12 hours. The washing step may remove all the residual alkali, acid, proteins, peptides and amino acids and the minerals using abundant deionized water. The proteins and minerals in squid pen may vary from different species, and the continuous process of deproteinization, demineralization and washing may be repeated 1~3 times. The drying step for the extraction may include air drying at room temperature, drying at elevated temperature with air flow, and freezing drying. The molecular weight of the extracted β-chitin as described herein may be about 1,000,000 to about 2,000,000 g/mol as measured by size exclusion chromatography (SEC).

The β-chitin may be dissolved in an aqueous alkali/urea solution, for example, according to the method disclosed in Chinese Patent No. CN103059320B, which is incorporated herein by reference in its entirety. Specifically, an aqueous alkali/urea solution may be used to dissolve chitin by freezing-thawing cycles, where the alkali includes lithium hydroxide, sodium hydroxide and potassium hydroxide and mixtures thereof, and the chitin includes a-chitin extracted from crab, shrimp and fungi and β-chitin extracted from squid and cuttlefish.

For example, potassium hydroxide and urea may be included in a solution to dissolve the chitin. The amount of potassium hydroxide may be about 8% to about 15% by weight. The amount of urea may be about 4% to about 6% by weight. The amount of dissolved β-chitin may be about 0.5% to about 3% by weight of the solution. The β-chitin may be first immersed in the aqueous potassium hydroxide/ urea solution to form a suspension, which may be then placed in the refrigerator at a temperature of about −30° ° C. to about 18° C. During this cooling period, the β-chitin may achieve high swelling and be partially dissolved in the suspension. The frozen suspension may be then thawed at room temperature, and vigorous stirring may be applied for well mixing to obtain the chitin solution. Such freezing and thawing treatment represents one freezing-thawing cycle. The freezing-thawing cycle may be performed 1 to 3 times to achieve a homogenous chitin solution, which is totally transparent and viscous. The chitin solution may contain air bubbles (e.g., from the mixing step). The chitin solution may be free of any swollen yet not dissolved bulk materials.

The introduced epoxy crosslinker in the present method may contain at least one epoxy group, e.g. epoxypropane, epichlorohydrin, diglycidyl ether, ethylene glycol diglycidyl ether, bisphenol A diglycidyl ether, 1, 6-hexanediol diglycidyl ether, glycerol diglycidyl ether, tris(4-hydroxyphenyl) methane triglycidyl ether, trimethylolpropane triglycidyl ether, poly(ethylene glycol) diglycidyl ether, etc. The molar ratio of the epoxy crosslinker to chitin monomer may be about 0.5:1 to about 20:1. Suitable epoxy crosslinkers may be selected to comply with biosafety in specific applications.

The introduced guanidine salts in the present method may include guanidine hydrochloride, guanidine carbonate, guanidine thiocyanate, guanidine nitrate, biguanide and its derivates, triguanide and its derivates, which are soluble in water. The molar ratio of the guanidine salts to epoxy crosslinker may be about 0.2:1 to about 2:1. Suitable guanidine salts may be selected to comply with biosafety in specific applications.

The solvent exchange treatment may be used to exchange water in the hydrogel to isopropyl alcohol. The hydrogel prepared in the invention may shrink significantly in isopropyl alcohol but maintain the polymer network integrity. The isopropyl alcohol also may be used to control the volume and density of the hydrogel. For example, the solvent exchange may be performed by gradient concentrated isopropyl alcohol aqueous solution.

The freeze drying of the organogel in the present method may be performed using a commercial freeze dryer. For example, before freeze drying, the organogel may be frozen by liquid nitrogen. A fast cooling process may generate small solvent crystal to avoid any polymer network damages. To increase the efficiency of the freeze drying, the sample may be cut into small pieces. The drying time may be about 1 day to about 3 days according to the total sample weight. The organic solvent (e.g. isopropyl alcohol) in the organogel may be completely removed by the freeze drying before the usage of the aerogel. After freeze drying, the aerogel sample may shrink a little more but without any isopropyl alcohol.

III. Exemplary Superabsorbent Materials

In another aspect, the present disclosure provides superabsorbent materials. Exemplary superabsorbent materials may result from a crosslinking between chitin, the epoxy crosslinker, and guanidine.

In some instances, the epoxy crosslinker may be selected according to the water solubility and biosafety. Exemplary epoxy crosslinkers may be epoxypropane, epichlorohydrin, diglycidyl ether, ethylene glycol diglycidyl ether, bisphenol A diglycidyl ether, 1, 6-hexanediol diglycidyl ether, glycerol diglycidyl ether, tris(4-hydroxyphenyl)methane triglycidyl ether, trimethylolpropane triglycidyl ether, poly(ethylene glycol) diglycidyl ether, and mixtures thereof.

In some instances, a molar ratio of the epoxy crosslinker to β-chitin is about 0.5:1 to about 20:1. In various instances, a molar ratio of the epoxy crosslinker to β-chitin may be no less than 0.5:1, no less than 1:1, no less than 2:1, no less than 5:1, no less than 10:1, no less than 15:1, or no less than 20:1. In various instances, a molar ratio of the epoxy crosslinker to β-chitin may be no greater than 20:1; no greater than 15:1; no greater than 10:1; no greater than 5:1; no greater than 2:1; no greater than 1:1. In various instances, a molar ratio of the epoxy crosslinker to β-chitin may be between 0.5:1 and 20:1; between 0.5:1 and 10:1; between 10:1 and 20:1; between 5:1 and 15:1; between 2:1 and 8:1; or between 12:1 and 18:1.

In some instances, the guanidine salt may be selected according to water solubility and biosafety. Exemplary guanidine salts may be guanidine hydrochloride, guanidine carbonate, guanidine thiocyanate, guanidine nitrate, biguanide and its derivates, triguanide and its derivates, and mixtures thereof.

In some instances, a molar ratio of the guanidine salt to the epoxy crosslinker may be between about 0.2:1 to about 2:1. In various instances, a molar ratio of the guanidine salt to the epoxy crosslinker may be no less than 0.2:1, no less than 0.5:1, no less than 1:1, no less than 1.2:1, no less than 1.5:1, or no less than 2:1. In various instances, a molar ratio of the guanidine salt to the epoxy crosslinker may be no greater than 2:1; no greater than 1.5:1; no greater than 1.2:1; no greater than 1:1; no greater than 0.75:1; or no greater than 0.25:1. In various instances, a molar ratio of the guanidine salt to the epoxy crosslinker may be between 0.2:1 and 2:1; between 0.2:1 and 1:1; between 1:1 and 2:1; between 0.5:1 and 1.5:1; between 0.75:1 and 2:1; between 0.8:1 and 1.2:1; or between 0.2:1 and 1.75:1.

In another aspect, the present disclosure provides a superabsorbent material comprising chitin crosslinked by an epoxy crosslinker, and guanidine attached to the crosslinked chitin. In some embodiments, the crosslinked chitin of the superabsorbent material is at least partially deacetylated. The crosslinked chitin may include both intact chitin and deacetylated chitin that are crosslinked by the epoxy crosslinker. In some embodiments, the guanidine is attached to the crosslinked chitin through the epoxy crosslinker. For example, a chitin or deacetylated chitin may be attached to one end of an epoxy crosslinker, and a guanidine may be attached to the other end of the same epoxy crosslinker.

In some embodiments, the present superabsorbent material may be in the form of an aerogel. For example, the chitin-based hydrogel as described herein may be dried to form an aerogel.

The present superabsorbent material, such as an aerogel produced by the method described herein, may swell rapidly and significantly in both water and acid solutions. The swelling capacity may be controlled by the ratio of chitin, epoxy crosslinker and guanidine salts. In some embodiments, a degree of deacetylation of chitin can be controlled in the present method to increase the absorption of an acid solution.

Unexpectedly, the addition of guanidine in the chitin-epoxy hydrogel produced herein may result in an increased swelling capacity in acid solutions, as compared to the unmodified chitin. It is hypothesized that the chemical modification of chitin as described herein provides a mechanism to improve swelling capacity in acid solution.

The present superabsorbent material may have a swelling capacity in acid solutions (pH<7, such as pH about 3 to less than 7) that is approximately the same as, or higher than a swelling capacity of the same superabsorbent material in neutral solutions (pH 7).

In another aspect, the present disclosure provides an edible composition comprising the superabsorbent material as disclosed herein. "Edible," as used herein, means suitable for human and/or animal consumption. The edible composition may further comprise one or more active agents. The edible composition may be useful for treatment of disease or disorder. The edible composition may be useful for delivering an effective amount of one or more active agents. For example, the edible composition may be administered for hyperchlorhydria treatment and obesity control.

The following non-limiting examples illustrate the methods and compositions of the present disclosure.

EXAMPLES

Example 1

To 98 g of an aqueous potassium hydroxide/urea solution (10 g potassium hydroxide, 4 g urea and 84 g water), 1 g of purified β-chitin was added at room temperature to get a suspension. The suspension was stored in a refrigerator at −20° C. for 12 h and was totally frozen. The frozen suspension was then thawed at room temperature and applied vigorous stirring during thawing, and the chitin gradually dissolved. After 3 times freezing thawing cycles, the chitin was totally dissolved and formed a homogenous chitin solution.

Further, 5 g of ethylene glycol diglycidyl ether as epoxy crosslinker and 5 g of guanidine hydrochloride salts were added into the chitin solution under stirring, respectively. After mixed well, the solution was transferred to a plate mold and covered with lid to avoid desiccation. The reaction started at the beginning of the introduction of epoxy crosslinker, and the reaction completed at room temperature after 6 h, and the as-prepared gel was obtained. The as-prepared gel was thoroughly washed by deionized water to get highly swelling hydrogel. Then isopropyl alcohol solution was employed for solvent exchanging. The isopropyl alcohol solutions in the concentration of 20%, 40%, 60%, 80% and 100% (w/w) were used in sequence to exchange all the water in the hydrogel to isopropyl alcohol. The hydrogel shrunk largely and became organogel after solvent exchange. Before freeze drying, liquid nitrogen was used to freeze the isopropyl alcohol rapidly, then the frozen sample was freeze dried in a commercial freeze dryer. After 2 days, the sample was totally dried.

The following Embodiments are included for reasons of completeness.

Embodiment 1. A method of preparing a superabsorbent material, the method comprising
  dissolving chitin in an aqueous solvent to form a solution;
  reacting the dissolved chitin with an epoxy crosslinker and guanidine, or a salt thereof, thereby forming a hydrogel; and
  drying the hydrogel.

Embodiment 2. The method according to Embodiment 1, wherein the solution comprises a hydroxide base, urea, or a combination thereof.

Embodiment 3. The method according to Embodiment 2, wherein the epoxy crosslinker is selected from the group consisting of epoxypropane, epichlorohydrin, diglycidyl ether, ethylene glycol diglycidyl ether, bisphenol A diglycidyl ether, 1, 6-hexanediol diglycidyl ether, glycerol diglycidyl ether, tris(4-hydroxyphenyl)methane triglycidyl ether, trimethylolpropane triglycidyl ether, poly(ethylene glycol) diglycidyl ether, and a combination thereof.

Embodiment 4. The method according to Embodiment 3, wherein the guanidine salt is selected from the group consisting of guanidine hydrochloride, guanidine carbonate, guanidine thiocyanate, guanidine nitrate, biguanide and its derivates, triguanide and its derivates, and a combination thereof.

Embodiment 5. The method according to Embodiment 4, wherein a molar ratio of the epoxy crosslinker to β-chitin is between about 0.5:1 to about 20:1.

Embodiment 6. The method according to Embodiment 5, wherein a molar ratio of the guanidine salt to the epoxy crosslinker is between about 0.2:1 to about 2:1.

Embodiment 7. The method according to Embodiment 6, further comprising extracting chitin from a natural source.

Embodiment 8. The method according to Embodiment 7, wherein the natural source comprises squid pen.

Embodiment 9. The method according to Embodiment 6, wherein the drying comprises exchanging the aqueous solvent remaining in the hydrogel to an organic solvent.

Embodiment 10. The method according to Embodiment 6, wherein the drying comprises freeze drying.

Embodiment 11. The method according to Embodiment 6, wherein the molar ratio of the epoxy crosslinker to β-chitin is between about 2:1 to about 8:1.

Embodiment 12. The method according to Embodiment 6, wherein a molar ratio of the guanidine salt to the epoxy crosslinker is between about 0.8:1 to about 1.2:1.

Embodiment 13. A superabsorbent material produced by the method of Embodiment 1.

Embodiment 14. The superabsorbent material of Embodiment 13, which is an aerogel.

Embodiment 15. An aerogel superabsorbent material comprising:
    chitin;
    epoxy crosslinker; and
    at least one guanidine salt,
        wherein the chitin is crosslinked by the epoxy crosslinker, and
        wherein guanidine is attached to the crosslinked chitin.

Embodiment 16. The aerogel superabsorbent material of Embodiment 15, wherein the crosslinked chitin is at least partially deacetylated.

Embodiment 17. The aerogel superabsorbent material of Embodiment 16, wherein the epoxy crosslinker is selected from the group consisting of epoxypropane, epichlorohydrin, diglycidyl ether, ethylene glycol diglycidyl ether, bisphenol A diglycidyl ether, 1, 6-hexanediol diglycidyl ether, glycerol diglycidyl ether, tris(4-hydroxyphenyl)methane triglycidyl ether, trimethylolpropane triglycidyl ether, poly(ethylene glycol) diglycidyl ether, and a combination thereof.

Embodiment 18. The aerogel superabsorbent material of Embodiment 17, wherein the at least one guanidine salt is selected from the group consisting of guanidine hydrochloride, guanidine carbonate, guanidine thiocyanate, guanidine nitrate, biguanide and its derivates, triguanide and its derivates, and a combination thereof.

Embodiment 19. The aerogel superabsorbent material of Embodiment 18, wherein a molar ratio of the epoxy crosslinker to β-chitin is between about 0.5:1 to about 20:1; and wherein a molar ratio of the guanidine salt to the epoxy crosslinker is between about 0.2:1 to about 2:1.

Embodiment 20. An edible composition comprising the superabsorbent material of Embodiment 19.

It is understood that the foregoing detailed description and accompanying examples are merely illustrative and are not to be taken as limitations upon the scope of the invention, which is defined solely by the following claims.

Various changes and modifications to the disclosed embodiments will be apparent to those skilled in the art. Such changes and modifications, including without limitation those relating to the chemical structures, substituents, derivatives, intermediates, syntheses, compositions, formulations, or methods of use of the invention, may be made without departing from the spirit and scope thereof.

What is claimed is:

1. A method of preparing a superabsorbent material, the method comprising
    dissolving β-chitin in an aqueous solvent comprising hydroxide base, urea or a combination thereof to form a solution;
    reacting the dissolved β-chitin with guanidine or salt thereof and an epoxy crosslinker selected from the group consisting of epoxypropane, epichlorohydrin, diglycidyl ether, ethylene glycol diglycidyl ether, bisphenol A diglycidyl ether, 1,6-hexanediol diglycidyl ether, glycerol diglycidyl ether, tris(4-hydroxyphenyl) methane triglycidyl ether, trimethylolpropane triglycidyl ether, poly(ethylene glycol) diglycidyl ether, and a combination thereof at a molar ratio of the guanidine or salt thereof to the epoxy crosslinker of about 0.2:1 to about 2:1, thereby forming a hydrogel; and
    drying the hydrogel.

2. The method according to claim 1, wherein the guanidine salt is selected from the group consisting of guanidine hydrochloride, guanidine carbonate, guanidine thiocyanate, guanidine nitrate, and a combination thereof.

3. The method according to claim 1, further comprising extracting chitin from a natural source.

4. The method according to claim 3, wherein the natural source comprises squid pen.

5. The method according to claim 1, wherein the drying comprises exchanging the aqueous solvent remaining in the hydrogel to an organic solvent.

6. The method according to claim 1, wherein the drying comprises freeze drying.

7. The method according to claim 1, wherein the molar ratio of the epoxy crosslinker to β-chitin is between about 2:1 to about 8:1.

8. The method according to claim 1, wherein a molar ratio of the guanidine salt to the epoxy crosslinker is between about 0.8:1 to about 1.2:1.

9. A superabsorbent material produced by the method of claim 1.

10. The superabsorbent material of claim 9, which is an aerogel.

11. An aerogel superabsorbent material comprising:
    ß-chitin;
    epoxy crosslinker selected from the group consisting of epoxypropane, epichlorohydrin, diglycidyl ether, ethylene glycol diglycidyl ether, bisphenol A diglycidyl ether, 1, 6-hexanediol diglycidyl ether, glycerol diglycidyl ether, tris (4-hydroxyphenyl) methane triglycidyl ether, trimethylolpropane triglycidyl ether, poly (ethylene glycol) diglycidyl ether, and a combination thereof; and
    at least one guanidine salt,
    wherein the β-chitin is crosslinked by the epoxy crosslinker,
    wherein guanidine is attached to the crosslinked chitin, wherein a molar ratio of the epoxy crosslinker to β-chitin is between about 0.5:1 to about 20:1; and wherein a molar ratio of the guanidine salt to the epoxy crosslinker is between about 0.2:1 to about 2:1.

12. The aerogel superabsorbent material of claim 11, wherein the crosslinked chitin is at least partially deacetylated.

13. The aerogel superabsorbent material of claim 11, wherein the at least one guanidine salt is selected from the group consisting of guanidine hydrochloride, guanidine carbonate, guanidine thiocyanate, guanidine nitrate, and a combination thereof.

14. An edible composition comprising the superabsorbent material of claim 12.

\* \* \* \* \*